US012781670B2

(12) United States Patent
Dautreppe

(10) Patent No.: US 12,781,670 B2
(45) Date of Patent: Nov. 3, 2026

(54) ACCESSORY GEARBOX FOR AN AIRCRAFT TURBINE ENGINE COMPRISING A VERY LOW-SPEED ENGINE AND USE METHOD

(71) Applicant: SAFRAN AIRCRAFT ENGINES, Paris (FR)

(72) Inventor: Frédéric Dautreppe, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/546,903

(22) PCT Filed: Feb. 24, 2022

(86) PCT No.: PCT/EP2022/054591

§ 371 (c)(1),
(2) Date: Aug. 17, 2023

(87) PCT Pub. No.: WO2022/189153

PCT Pub. Date: Sep. 15, 2022

(65) Prior Publication Data

US 2024/0133346 A1 Apr. 25, 2024
US 2024/0229721 A9 Jul. 11, 2024

(30) Foreign Application Priority Data

Mar. 12, 2021 (FR) ........................................ 2102434

(51) Int. Cl.
*F02C 7/32* (2006.01)
*B64D 35/00* (2006.01)
(Continued)

(52) U.S. Cl.
CPC ................ *F02C 7/32* (2013.01); *B64D 35/00* (2013.01); *F01D 15/12* (2013.01); *F01D 25/34* (2013.01);
(Continued)

(58) Field of Classification Search
CPC .......... F01D 25/34; F01D 25/36; F01D 15/12; F05D 2260/4023; F05D 2260/40;
(Continued)

(56) References Cited

U.S. PATENT DOCUMENTS 5,655,967 A * 8/1997 Lopez ................... F16F 15/129
464/68.92
5,771,695 A * 6/1998 Halimi .................... F02B 39/10
60/607

(Continued)

FOREIGN PATENT DOCUMENTS

EP 3318727 A1 5/2018
EP 3415729 A1 12/2018

OTHER PUBLICATIONS

Search Report from the French Intellectual Property Office on corresponding FR application (FR2102434) dated Nov. 17, 2021.

(Continued)

*Primary Examiner* — Phutthiwat Wongwian
*Assistant Examiner* — Roberto Toshiharu Igue
(74) *Attorney, Agent, or Firm* — Alumen IP Law PC

(57) ABSTRACT

An accessory gearbox for an aircraft turbine engine having a radial shaft connecting a high-pressure body of the turbine engine to a gear train having at least one mixed shaft coupled to a high-speed device. The accessory gearbox has a clutch system having a low-speed motor mounted thereon and configured to mate with the mixed shaft such that: in an engaged position of the clutch, the low-speed motor is coupled to the mixed shaft so as to drive the high-pressure body at low speed when the turbine engine is stationary and, in a disengaged position of the clutch, the low-speed motor is decoupled from the mixed shaft so as to be protected when the turbine engine is in operation.

11 Claims, 4 Drawing Sheets

(51) Int. Cl.
*F01D 15/12* (2006.01)
*F01D 25/34* (2006.01)
*F01D 25/36* (2006.01)
*F16H 1/22* (2006.01)

(52) U.S. Cl.
CPC ...... *F01D 25/36* (2013.01); *F05D 2260/4023* (2013.01); *F05D 2260/4031* (2013.01); *F16H 1/22* (2013.01)

(58) Field of Classification Search
CPC ... F05D 2260/4031; F02C 7/32; B64D 35/00; F16H 1/22
See application file for complete search history.

(56) References Cited

U.S. PATENT DOCUMENTS

| | | | | |
|---|---|---|---|---|
| 9,664,070 | B1 | 5/2017 | Lauson et al. | |
| 10,801,371 | B2 * | 10/2020 | Clauson | F01D 21/00 |
| 2009/0120762 | A1 * | 5/2009 | Gonzalez Alemany | B66B 23/028 198/330 |
| 2017/0234237 | A1 * | 8/2017 | Pech | F01D 15/10 60/778 |
| 2022/0003171 | A1 * | 1/2022 | Matsuda | F16H 37/022 |
| 2022/0195886 | A1 * | 6/2022 | Devendorf | F01D 19/00 |
| 2022/0348347 | A1 * | 11/2022 | Finke | F02C 7/32 |
| 2024/0204617 | A1 * | 6/2024 | Lee | H02K 7/083 |

OTHER PUBLICATIONS

International Search Report and Written Opinion on corresponding PCT application (PCT/EP2022/054591) from International Searching Authority (EPO) dated May 17, 2022.

* cited by examiner

ACCESSORY GEARBOX FOR AN AIRCRAFT TURBINE ENGINE COMPRISING A VERY LOW-SPEED ENGINE AND USE METHOD

TECHNICAL FIELD

The present invention relates to an aircraft turbomachine comprising an accessory gearbox, or "AGB", in which a very low-speed motor is mounted.

BACKGROUND

In a known manner, with reference to FIG. 1, a turbomachine 800 extending along a longitudinal axis X is represented and configured to enable propulsion of an aircraft from the acceleration of an air flow flowing upstream to downstream in the turbomachine 800. Hereinafter, the terms "upstream" and "downstream" are defined with respect to the orientation of the longitudinal axis X. The terms "internal" and "external" in turn are defined along the radial direction with respect to the longitudinal axis X.

In a known manner, the turbomachine 800 represented in FIG. 1 is of the twin spool turbofan type and comprises, upstream, a fan 520 mounted in a fan casing 300, and downstream, a core compartment 700 delimiting a radially internal primary stream V100, and a radially external secondary stream V200, each guiding part of the air flow. At the primary stream V100, upstream to downstream, the turbomachine 800 comprises a low-pressure compressor 530 upstream, a high-pressure compressor 420, a combustion chamber 600, a high-pressure turbine 430 and a low-pressure turbine 540. The low-pressure turbine 540 is configured to rotatably drive the low-pressure compressor 530 and the fan 520 via a low-pressure shaft 510, forming a low-pressure spool 500 together. The high-pressure turbine 430 is in turn configured to rotatably drive the high-pressure compressor 420 via a high-pressure shaft 410, forming a high-pressure spool 400 together. The high-pressure shaft 410 extends externally around the low-pressure shaft 510 along the longitudinal axis X.

In practice, after the turbomachine 800 has stopped, air convection generates a vertical thermal gradient in the primary stream V100, especially at the high-pressure spool 400, in particular in the high-pressure compressor 410. Such a thermal gradient tends to expand the high-pressure spool 400 in a differentiated manner and generate an undesirable camber. Such a phenomenon is known to the skilled person as the "bowed rotor" and reaches its peak about two hours after the turbomachine 800 has stopped.

To avoid this phenomenon, it is known to drive the turbomachine 800 at very low speed after it has stopped, so as to circulate air to have homogenized air temperature in the primary stream V100 of the turbomachine 800 and to avoid the appearance of a thermal gradient. To this end, it was provided to rotatably drive the high-pressure compressor 420 by applying a drive torque to the accessory gearbox 200 of the turbomachine 800 which is connected to the high-pressure compressor 420 by a radial shaft 210 positioned in a structural arm 310 or an outer guide vane, or "OGV".

In a known manner, as illustrated in FIGS. 1 and 2, the accessory gearbox 200 is known to be mounted externally to the fan casing 300. The accessory gearbox 200 comprises a gear train 220 comprising an input shaft 230 coupled to the radial shaft 210 and a plurality of output shafts 240 each coupled to one piece of equipment E, or even several pieces of equipment E in series. For example, equipment E refers to fuel pumps, electrical generators, lubrication units, a starter and an oil separator. When the turbomachine 800 is in operation, the input shaft 230 provides torque to the output shafts 240. Conversely, when the turbomachine 800 is stopped, equipment E can provide torque to the input shaft 230 and rotatably drive the high-pressure compressor 420.

A first solution to drive the high-pressure compressor 420 after the turbomachine 800 has stopped would be to use the starter of the accessory gearbox 200, traditionally used at start-up to drive the high-pressure spool 400 at a very high rotational speed for a short time. However, such a starter, due to its primary function, is not suitable for driving at very low speed for a long time. An alternative solution would be to use a motor-generator whose function is to generate electrical energy during operation of the turbomachine 800. However, such a generator motor only performs at the turbomachine's operating speeds, that is, high speeds compared to that required for thermal balancing, and does not enable driving at very low speed for a long time.

To overcome these drawbacks, it is known to add in the accessory gearbox 200 an electric motor dedicated to driving the high-pressure compressor 420 at very low speed for a long time, that is, about 1 to 10 rpm for about one to several hours. While such a very low-speed motor enables sufficient rotation for efficient thermal balancing and avoids the appearance of the "bowed rotor" phenomenon, it does however undesirably increase the mass and overall size of the accessory gearbox 200. Indeed, due to its very low speed, the very low-speed motor is not compatible with the other equipment E of the accessory gearbox 200 and requires mounting to a very low-speed drive shaft 230 dedicated to it, which requires modifying the accessory gearbox 200. U.S. Pat. No. 9,664,070B1 and patent application EP3415729A1 thus teach a start-up shaft distinct from the high-speed shafts to which a very low-speed electric motor is mounted.

One solution to eliminate this drawback would be to provide a generator motor that is able to operate as a generator at high speed while being able to operate as a motor at very low speed so that it can be mounted to a drive shaft 230 in series with another equipment E configured to operate over a high speed range. Such a solution proves to be complex, expensive and would penalize the mass and overall size of the accessory gearbox 200.

The aim of the invention is thus an accessory gearbox for an aircraft turbomachine comprising a very low-speed motor that eliminates at least part of the drawbacks mentioned above.

SUMMARY

The invention relates to an accessory gearbox for an aircraft turbomachine, the turbomachine extending along a longitudinal axis and comprising a low-pressure spool, a high-pressure spool and a configured radial shaft connected to the high-pressure spool, the accessory gearbox comprising a gear train comprising at least one input shaft, configured to be mechanically coupled to the radial shaft, and a plurality of output shafts, configured to be rotatably coupled with equipment, at least one output shaft, hereinafter referred to as the mixed shaft, being rotatably coupled with high-speed equipment configured to operate over a high speed range.

The invention is remarkable in that the accessory gearbox comprises:

- a very low-speed motor configured to operate over a very low speed range, below the high speed range of said high-speed equipment, a clutch system configured to mate with said mixed shaft, the very low-speed motor being mounted to the clutch system such that:

in a clutched position of the clutch system, the very low-speed motor is coupled to the mixed shaft, so as to rotatably drive the high-pressure spool, when the turbomachine is stopped, and in a declutched position of the clutch system, the very low-speed motor is decoupled from the mixed shaft in order to be protected from the speeds transmitted by the high-pressure spool to drive the high-speed equipment when the turbomachine is in operation.

By means of the invention, a very low-speed motor, perfectly adapted to drive the high-pressure spool, is integrated compactly, conveniently and economically into the accessory gearbox. Indeed, the very low-speed motor is mounted in series with high-speed equipment to a same output shaft, overcoming the technical difficulties related to their incompatibility. By means of the clutch system of the invention, the very low-speed motor can advantageously be decoupled from the gear shaft when it is driven by the high-pressure spool, that is, when the turbomachine is in operation. This protects the very low-speed motor from the operating speeds of the turbomachine. Thus, the invention advantageously avoids using an output shaft dedicated to the very low-speed motor and thus limits the mass and the overall size. Such a clutch system is further simple and convenient, which avoids adding complexity to the accessory gearbox.

According to one aspect of the invention, the very low-speed motor is of the electrical type, which gives it a simple and economical structure. Preferably, the very low-speed motor is free of a reducer in order to limit its mass and overall size.

According to one aspect of the invention, the very low-speed motor comprises a rotor and a stator, the clutch system comprising:

a flywheel rotatably integral with the mixed shaft, a support member rotatably integral with the rotor of the very low-speed motor, mounted free to rotate around the mixed shaft, a movable disk and a fixed disk along the longitudinal axis mounted to the support member on either side of the flywheel, and a movement member for moving the movable disk so that in the clutched position, the flywheel is engaged with the movable disk and the fixed disk, and in the declutched position, the flywheel is disengaged from the movable disk and the fixed disk.

Such a clutch system has a simple and convenient structure that makes it easy to couple and decouple the very low-speed motor.

According to one aspect of the invention, the flywheel is freely mounted along the longitudinal axis to the mixed shaft, so as to be moved against the fixed disk by the movable disk, under the action of the movement member.

According to a preferred aspect of the invention, the clutch system comprises means for mounting the flywheel to the mixed shaft configured to allow longitudinal movement and block radial and tangential movement of the flywheel in relation to the mixed shaft. Preferably, the mounting means are in the form of longitudinal splines. Such mounting means advantageously promote the engagement of the disks to the flywheel, and thus the transition between the declutched position and clutched position.

According to one aspect of the invention, the movement member is in the form of an electromagnetic actuator. Such a movement member is economical.

According to one aspect of the invention, the movable disk and the fixed disk are free of lining. Such disks are advantageously adapted for engagement when the mixed shaft is stopped. They also save mass, money and require less maintenance.

According to a preferred aspect of the invention, the clutch system comprises a multiplier mounted to the support member between the very low-speed motor and the flywheel, configured to drive the flywheel at a rotational speed higher than that of the very low-speed motor. This advantageously compensates for the resistant torque of the gear train, so as to drive the high-pressure spool at the speed of the very low-speed motor.

The invention also relates to an aircraft turbomachine extending along a longitudinal axis and comprising a low-pressure spool, a high-pressure spool and a radial shaft connected to the high-pressure spool, said turbomachine comprising an accessory gearbox as described previously wherein:

the input shaft of the accessory gearbox is mechanically coupled to the radial shaft, in the clutched position, the very low-speed motor is coupled to the high-pressure spool so as to rotatably drive it, in order to promote its cooling by air circulation when the turbomachine is stopped, in the declutched position, the very low-speed motor is decoupled from the high-pressure spool to be protected from the high speeds transmitted by the high-pressure spool to the mixed shaft to drive the high-speed equipment when the turbomachine is in operation.

Advantageously, such a very low-speed motor enables the high-pressure spool to be driven at very low speed when the turbomachine is stopped, so as to circulate air to have homogenized air temperature in the primary stream of the turbomachine, especially at the high-pressure compressor. This promotes cooling of the turbomachine by avoiding the appearance of the "bowed rotor" phenomenon, that is, the camber of the high-pressure spool caused by a differentiated thermal expansion. This promotes the performance and service life of the turbomachine in the medium and long term. Such a turbomachine is especially suitable for several flights per day due to its promoted cooling.

According to one aspect of the invention, the high-pressure spool comprises a high-pressure compressor, a high-pressure turbine and a high-pressure shaft mechanically connecting the high-pressure compressor and the high-pressure turbine, the radial shaft being connected to the high-pressure shaft of the high-pressure spool. The very low-speed motor advantageously enables only the high-pressure compressor and the high-pressure turbine to be driven, in which the "bowed rotor" phenomenon is most likely to appear. The accessory gearbox is also used in reverse operation, that is, as a motor, in relation to its normal operation when the turbomachine is operating, that is, passive driven by the high-pressure spool.

The invention further relates to a method of using an aircraft turbomachine as described previously, wherein the clutch system is initially in the declutched position, the method of use comprising:

after the turbomachine has stopped, a step of clutching the very low-speed motor to the mixed shaft, by moving the clutch system to the clutched position, and a step of driving, by the very low-speed motor, the mixed shaft, so as to rotatably drive the high-pressure spool in order to promote its cooling by air circulation.

Such a method is advantageously simple and convenient to implement, while being very efficient. Indeed, it only requires coupling the very low-speed motor to the mixed shaft before implementing air circulation. Air circulation is advantageously implemented at low speed and over a relatively long time by means of an adapted dedicated very low-speed motor.

Preferably, during the clutching step, the mixed shaft is stopped, so as to promote the service life of the movable disk and the fixed disk by minimizing friction when engaging with the flywheel.

According to a preferred aspect of the invention, during the driving step, the very low-speed motor drives the mixed shaft at a speed of less than 10 rpm, preferably less than 5 rpm. The very low-speed motor is advantageously adapted to very low speeds, which enables the hottest parts of the high-pressure spool which are located at the top to be rotatably driven downwards regularly, thus causing effective air circulation, especially by convection in the high-pressure spool.

According to one aspect of the invention, during the driving step, the very low-speed motor drives the mixed shaft for a duration of more than 30 minutes, preferably more than 45 minutes. This enables air circulation through the high-pressure spool long enough and effective to avoid the appearance of the "bowed rotor" phenomenon. Indeed, such a phenomenon may appear and last for several hours after the turbomachine has stopped.

According to a preferred aspect, the method of use comprises, after the driving step, a step of declutching the very low-speed motor from the mixed shaft by moving the clutch system to the declutched position. The turbomachine is thus ready for a new operation phase simply and conveniently. The very low-speed motor is decoupled to avoid being driven at high speed, for which it is not adapted.

Preferably, during the declutching step, the mixed shaft is stopped, so as to promote the service life of the movable disk and the fixed disk by minimizing friction when disengaging from the flywheel.

According to a preferred aspect, the method of use is implemented automatically, that is, without intervention by the pilot or an operator after the turbomachine has stopped.

According to a preferred aspect, during operation of the turbomachine, the clutch system is in the declutched position so that the high-pressure spool drives the mixed shaft decoupled from the very low-speed motor, in order to drive only the high-speed equipment. The mixed shaft is used for both low and high speed ranges, both during operation of the turbomachine and after it has stopped. This optimizes the use of the mixed shaft and makes the accessory gearbox more compact.

BRIEF DESCRIPTION OF THE DRAWINGS

The invention will be better understood upon reading the following description, given as an example, and by referring to the following figures, given as non-limiting examples, wherein identical references are given to similar objects.

It should be noted that the figures set out the invention in detail in order to implement the invention, said figures may of course be used to better define the invention where applicable.

DETAILED DESCRIPTION

The invention relates to an aircraft turbomachine making it possible to integrate a very low-speed motor into the accessory gearbox compactly, economically and conveniently, in order to drive the high-pressure spool at very low speed to promote its cooling after the turbomachine has stopped.

Figure 1:
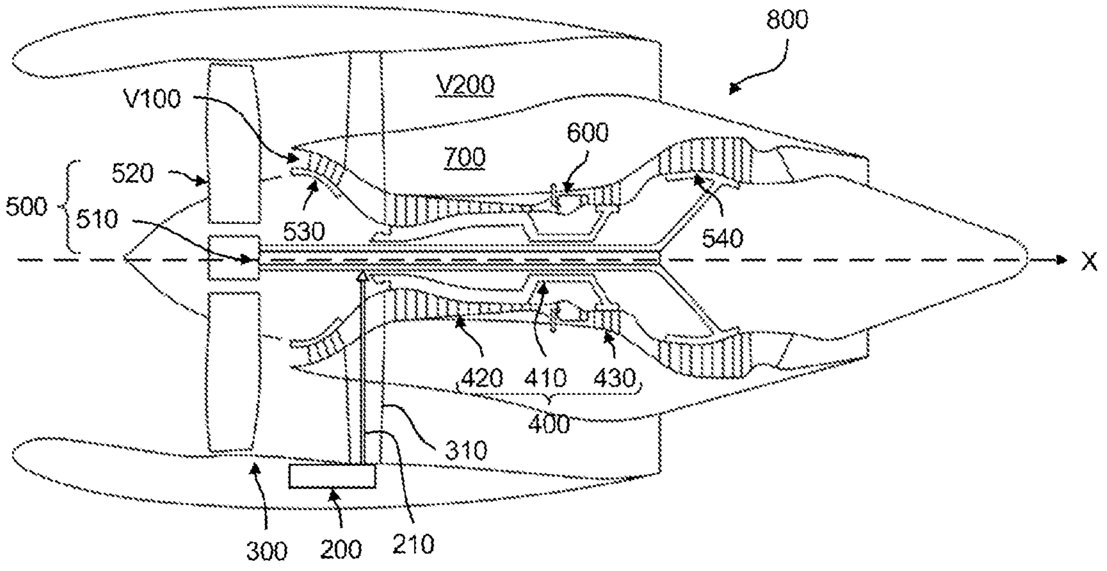
FIG. 1 is a longitudinal cross-section schematic representation of an aircraft turbomachine comprising an accessory gearbox according to prior art.
Figure 2:
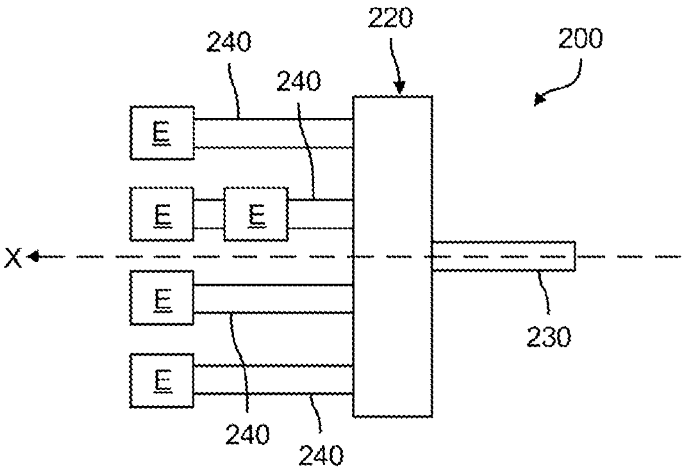
FIG. 2 is a circumferential cross-section schematic representation of the accessory gearbox of FIG. 1.
Figure 3:
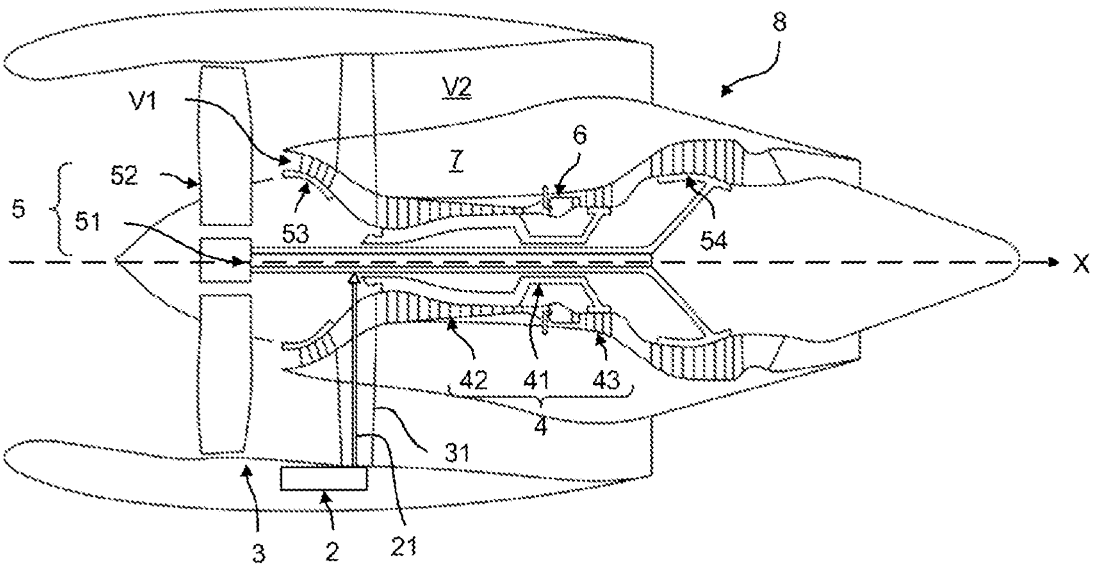
FIG. 3 is a longitudinal cross-section schematic representation of an aircraft turbomachine comprising an accessory gearbox with a clutch system of a very low-speed motor according to one embodiment of the invention.

As illustrated in FIG. 3 and described in the preamble, a turbomachine 8 extending along a longitudinal axis X is represented and configured to enable propulsion of an aircraft from the acceleration of an air flow flowing upstream to downstream in the turbomachine 8. Hereinafter, the terms "upstream" and "downstream" are defined with respect to the orientation of the longitudinal axis X. The terms "internal" and "external" in turn are defined along the radial direction with respect to the longitudinal axis X.

As described in the preamble, the turbomachine 8 represented in FIG. 3 is of the twin spool turbofan type and comprises, upstream, a fan 52 mounted in a fan casing 3, and downstream, a core compartment 7 delimiting a radially internal primary stream V1, and a radially external secondary stream V2, each guiding part of the air flow. At the primary stream V1, the turbomachine 8 comprises upstream to downstream a low-pressure compressor 53, a high-pressure compressor 42, a combustion chamber 6, a high-pressure turbine 43 and a low-pressure turbine 54. The low-pressure turbine 54 is configured to rotatably drive the low-pressure compressor 53 and the fan 52 via a low-pressure shaft 51, forming a low-pressure spool 5 together. The high-pressure turbine 43 is configured to rotatably drive the high-pressure compressor 42 via a high-pressure shaft 41, forming a high-pressure spool 4 together. The high-pressure shaft 41 extends externally around the low-pressure shaft 51 along the longitudinal axis X.

Figure 4:
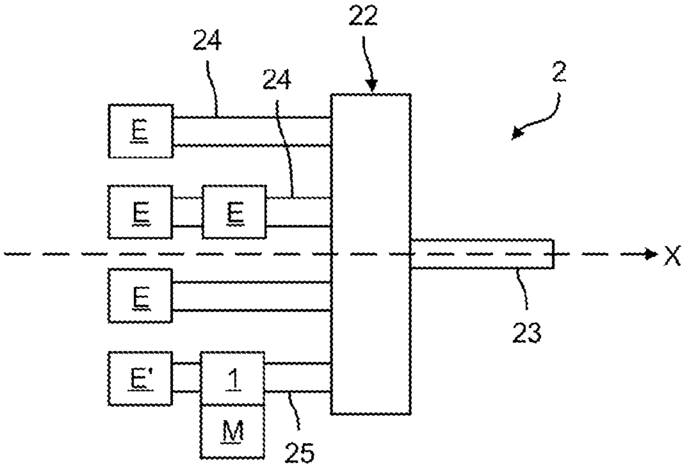
FIG. 4 is a circumferential cross-section schematic representation of the accessory gearbox of FIG. 3.

As illustrated in FIGS. 3 and 4 and described in the preamble, the turbomachine 8 also comprises an accessory gearbox 2 which is connected to the high-pressure compressor 42 by a radial shaft 21 positioned in a structural arm known as the "outer guide vane" 31, or "OGV". The accessory gearbox 2 is mounted externally to the fan casing 3. The accessory gearbox 2 comprises a gear train 22 comprising an input shaft 23 coupled to the radial shaft 21 and a plurality of output shafts 24 each coupled to one piece of equipment E, or even two pieces of equipment E in series. For example, equipment E refers to fuel pumps, electrical generators, lubrication units, a starter and an oil separator. When the turbomachine 8 is in operation, the input shaft 23 provides torque to the output shafts 24. Conversely, when the turbomachine 8 is stopped, equipment E can provide torque to the input shaft 23 and rotatably drive the high-pressure compressor 42.

According to the invention, with reference to FIG. 4, the accessory gearbox 2 comprises:

- a mixed shaft 25 among the output shafts 24, rotatably coupled with high-speed equipment E' configured to operate over a high speed range,
- a very low-speed motor M configured to operate over a low speed range, below the high speed range of said high-speed equipment E',
- a clutch system 1 configured to mate with the mixed shaft 25, the very low-speed motor M being mounted to the clutch system 1 so that:
  - in a clutched position P1 of the clutch system 1, the very low-speed motor M is coupled to the mixed shaft 25, so as to rotatably drive the high-pressure spool 4, when the turbomachine 8 is stopped A, and
  - in a declutched position P2 of the clutch system 1, the very low-speed motor M is decoupled from the mixed shaft 25 in order to be protected from the speeds transmitted by the high-pressure spool 4 to supply the high-speed equipment E' when the turbomachine 8 is in operation F.

Preferably, the high-speed equipment E' is in the form of an electric generator. However, it goes without saying that the high-speed equipment E' could be in another form, such as a lubrication unit, a fuel pump or a hydraulic pump as non-limiting examples.

The invention thus makes it possible, in the clutched position P1, to drive the high-pressure spool 4 at low speed, and especially the high-pressure compressor 42, to promote its cooling. Indeed, air circulation after the turbomachine 8 has stopped makes it possible to avoid the appearance of a vertical thermal gradient in the primary stream V1 generated by convection and radiation, which tends to expand the high-pressure spool 4 in a differentiated manner and to generate an undesirable camber, such a phenomenon being known the skilled person as a "bowed rotor". The very low-speed motor M is advantageously adapted to provide a low speed adapted to air circulation, and this over a sufficient duration to be efficient.

Additionally, the invention makes it possible to integrate the very low-speed motor M compactly, economically and conveniently into the accessory gearbox 2, that is, in series with a high-speed equipment E', overcoming the technical difficulties related to their incompatibility. Indeed, the use of a compact and economical clutch system 1 advantageously enables the very low-speed motor M to be decoupled when the turbomachine 8 is in operation F and drives the mixed shaft 25 over a high speed range, incompatible with the very low-speed motor M.

It is specified that the turbomachine 8 is said to be in operation F when the combustion chamber 6 is supplied with fuel and stopped when the combustion chamber 6 is not supplied with fuel.

In this example, the mixed shaft 25 is unique because a single very low-speed motor M is sufficient to drive the high-pressure spool 4 in order to promote its cooling. However, it goes without saying that the accessory gearbox 2 could comprise several mixed shafts 25 each comprising a very low-speed motor M. One of the very low-speed motors M could be dedicated to cooling the turbomachine 8 to avoid the "bowed rotor" and the others dedicated to a different function.

Figure 5A:
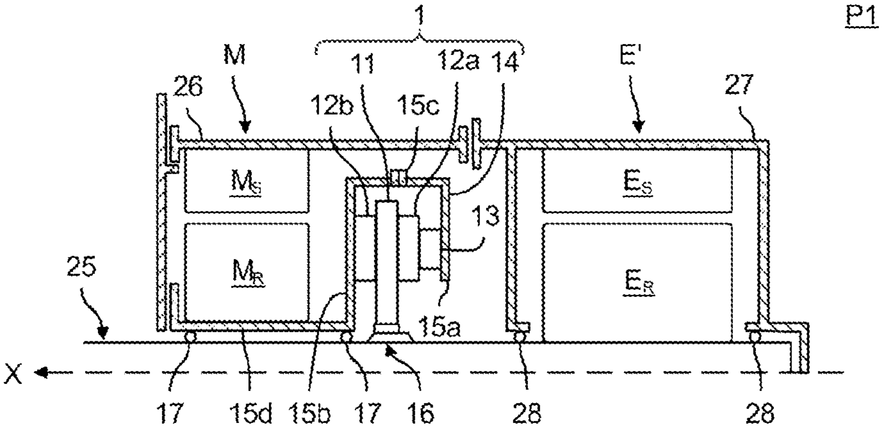
FIG. 5A is a longitudinal half-cross section schematic representation of the mixed shaft of the accessory gearbox of FIG. 4 comprising the very low-speed motor when the clutch system is in the clutched position.
Figure 5B:
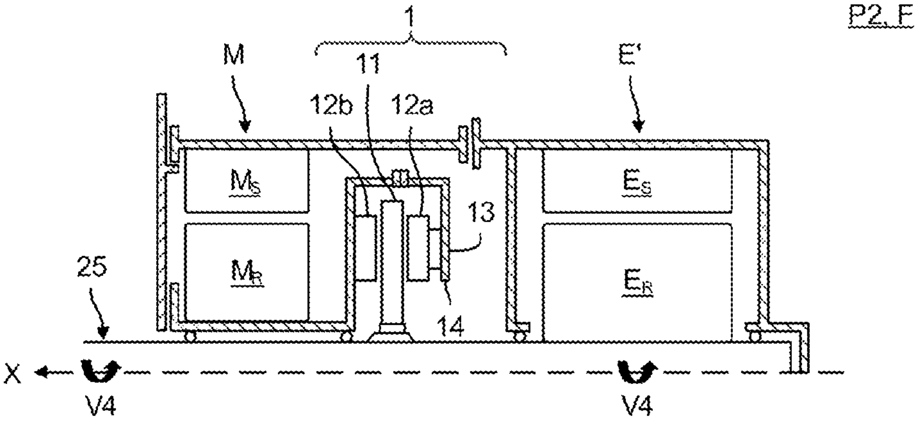
FIG. 5B is a longitudinal half-cross section schematic representation of the mixed shaft of FIG. 5A when the clutch system is in the declutched position during operation of the turbomachine.

In the example of FIGS. 5A and 5B, the clutch system 1 is positioned axially on the mixed shaft 25 between the very low-speed motor M and the high-speed equipment E', the very low-speed motor M being closest to the gear train 22. The very low-speed motor M comprises a rotor $M_R$, that is, a movable part, which is rotatably integral with the clutch system 1, and a stator $M_S$, that is, a fixed part, which is mounted to a motor casing 26 connected to an equipment casing 27 connected to the fan casing 3 (FIG. 3). The high-speed equipment E' comprises in turn a rotor $E_R$, which is rotatably integral with the mixed shaft 25, and a stator $E_S$, which is integral with the equipment casing 27 as well as the stator $M_S$ of the very low-speed motor M. In the example of FIGS. 5A and 5B, a set of bearings 28 is positioned between the equipment casing 27 and the mixed shaft 25 so as to hold the fixed equipment casing 27 decoupled from the movable mixed shaft 25. It goes without saying that the clutch system 1, the very low-speed motor M and the high-speed equipment E' could be positioned axially differently. For example, the clutch system 1 and the very low-speed motor M could be reversed.

Still in the example of FIGS. 5A and 5B, the mixed shaft 25 is in one piece. According to another preferred aspect, the mixed shaft 25 is in the form of two coaxial shafts assembled to each other so as to be rotatably integral. One of the coaxial shafts is configured to support the high-speed equipment E' and the other the very low-speed motor M. This enables easy disassembly of the shaft with the high-speed equipment E', the equipment casing 27 having previously been disassembled from the motor casing 26.

The clutch system 1 is described in more detail hereinafter.

As illustrated in FIGS. 5A and 5B, the clutch system 1 comprises a part coupled to the mixed shaft 25 and a free part to which the very low-speed motor M is mounted, the coupled part and the free part being configured to engage in order to couple the very low-speed motor M to the mixed shaft 25. More precisely, the clutch system 1 comprises a flywheel 11, mounted to the mixed shaft 25 so as to be rotatably coupled, as well as a support member 14 freely mounted around the mixed shaft 25. The rotor MR of the very low-speed motor M is mounted rotatably integral with the support member 14. The clutch system 1 further comprises a fixed disk 12*b* and a movable disk 12*a* mounted either side of the flywheel 11 to the support member 14. A movement member 13 is configured to move the movable disk 12*a* so that:

- in the clutched position P1 illustrated in FIG. 5A, the fixed disk 12*b* and the movable disk 12*a* are engaged with the flywheel 11, that is, sandwich the flywheel 11 to couple the support member 14 to the mixed shaft 25,
- in the declutched position P2 illustrated in FIG. 5B, the fixed disk 12*b* and the movable disk 12*a* extend disengaged from the flywheel 11 in order to decouple the support member 14 from the mixed shaft 25.

In the example of FIGS. 5A and 5B, the movement member 13 is in the form of an electromagnetic actuator mounted to the support member 14 on the side of the movable disk 12*a*. Such a movement member 13 is advantageously in the form of an on/off control system (TOR) of simple and economical design. However, it goes without saying that a different movement member 13 could be used.

Still in the example of FIGS. 5A and 5B, the support member 14 comprises two mounting portions 15*a*, 15*b* facing each other on either side of the flywheel 11, portions to which the fixed disk 12*b* and the movable disk 12*a* are mounted. The support member 14 also comprises a bonding portion 15*c* connecting the mounting portions 15*a*, 15*b* as well as a coupling portion 15*d* to which the rotor MR of the very low-speed motor M is mounted. The bonding portion 15*c* is provided to enable the assembly and disassembly of the mounting portions 15*a*, 15*b*, in order to enable the flywheel 11 to be mounted (or dismantled and replaced) inside the support member 14. A set of bearings 17 is positioned between the coupling portion 15*d* and the mixed shaft 25 so as to hold the support member 14 decoupled from the mixed shaft 25. Such bearings 17 are, for example, ball bearings, and may be provided to axially hold the support member 14 in relation to the mixed shaft 25, so that there is no risk of friction of the coupling portion 15*d* against the accessory gearbox 2 when the rotor MR of the very low-speed motor M is rotated.

Preferably, as illustrated in FIGS. 5A and 5B, the flywheel 11 is mounted to the mixed shaft 25 by coupling means 16 configured to allow longitudinal movement and block radial and tangential movement of the flywheel 11 in relation to the mixed shaft 25 to enable transmission of the rotational torque. This makes it possible to hold the flywheel 11 rotatably integral with the mixed shaft 25 while enabling the forces experienced by the support member 14 in the axial direction to be greatly limited. Indeed, since the flywheel 11 is designed to slide in relation to the mixed shaft 25, engagement with and/or disengagement from the disks 12*a*, 12*b* does not cause any particular axial force on the support member 14. In practice, moving the movable disk 12*a* to the clutched position P1 drives the movement of the flywheel 11 against the fixed disk 12*b*, as will be seen hereinafter in the method of use.

Preferably also, the movable disk 12*a* and the fixed disk 12*b* are free of lining, that is, of friction surface configured to contact the flywheel 11 to protect the disks 12*a*, 12*b*. Indeed, as will be seen hereinafter, the movement between the clutched position P1 and the declutched position P2 is implemented when the turbomachine 8 is stopped, the mixed shaft 25 also being stopped. This minimizes wear and tear on the disks 12*a*, 12*b* and reduces their maintenance. The mass and cost of such disks 12*a*, 12*b* are advantageously reduced.

In some embodiments of the invention, the clutch system 11 also comprises a multiplier (not represented) mounted to the support member 14 between the very low-speed motor M and the flywheel 11. The multiplier is configured to drive the flywheel 11 at a rotational speed higher than that of the very low-speed motor M, in order to compensate for the resistant torque of the gear train 22, so as to drive the high-pressure spool 4 at the speed of the very low-speed motor M.

With reference to FIG. 5B, the invention also relates to a method of using the turbomachine 8 described previously, wherein, during operation F of the turbomachine 8, the clutch system 1 is in the declutched position P2 so that the high-pressure spool 4 drives the mixed shaft 25 decoupled from the very low-speed motor M. In other words, during operation of the turbomachine 8, the drive torque V4 of the high-pressure spool 4 is only transmitted to the high-speed equipment E' to supply it. In the case of an electrical generator, it can advantageously provide electrical energy. This advantageously protects the very low-speed motor M from high speeds.

Figure 6:
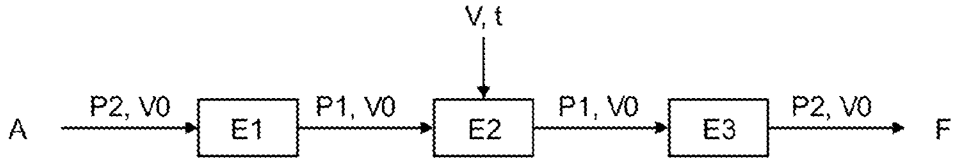
FIG. 6 is a schematic representation of an implementation of a method of use according to the invention of the accessory gearbox of FIG. 4 after the turbomachine has stopped.

With reference to FIG. 6, the method of use also comprises, after the turbomachine 8 has stopped:

- a step of clutching E1 the very low-speed motor M to the mixed shaft 25, by moving the clutch system 1 to the clutched position P1,
- a step of driving E2, by the very low-speed motor M, the mixed shaft 25, so as to rotatably drive the high-pressure spool 4 in order to promote its cooling by air circulation, and
- a step of declutching E3 the very low-speed motor M from the mixed shaft 25, by moving the clutch system 1 to the declutched position P2.

Figure 7:
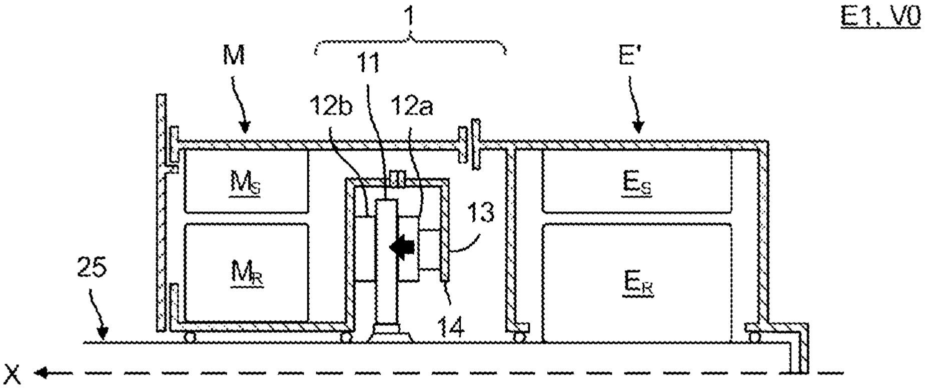
FIG. 7 is a schematic representation of the clutching step of the very low-speed motor according to the method of use of FIG. 6.

As illustrated in FIG. 7, following an operating phase F (FIG. 5B) where the clutch system 1 is in the declutched position P2, the turbomachine 8 is brought to a stop A (for example, following a landing) and ceases driving the high-pressure spool 4 and as a result the mixed shaft 25. The clutching step E1 then enables the clutch system 1 to be moved to the clutched position P1 to couple the very low-speed motor M to the mixed shaft 25. More precisely, the clutching step E1 is implemented by the movement member 13 to engage the disks 12*a*, 12*b* with the flywheel 11. Preferably, the clutching step E1 is implemented when the mixed shaft 25 is stopped to minimize friction of the flywheel 11 on the disks 12*a*, 12*b*, which can thus be free of lining.

Figure 8:
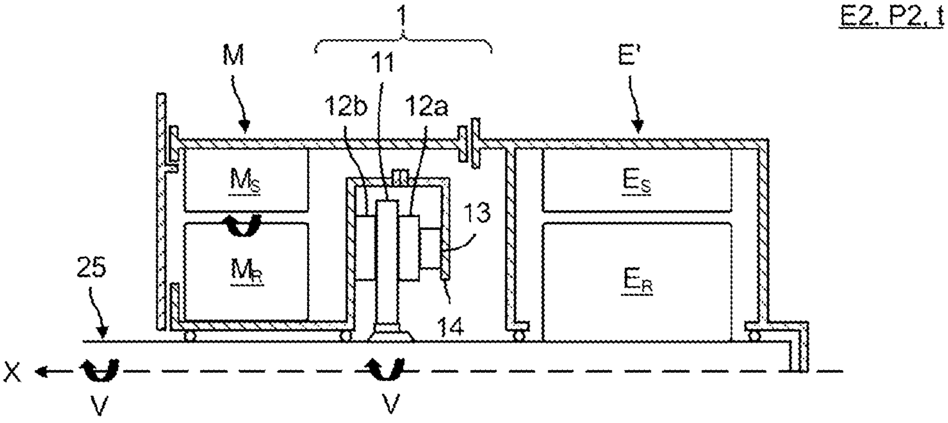
FIG. 8 is a schematic representation of the step of driving the mixed shaft to promote cooling of the high-pressure spool according to the method of use of FIG. 6.

As illustrated in FIG. 8, at the end of the clutching step E1, the turbomachine 8 is still stopped A and the clutch system 1 is in the clutched position P1. Following an operator command or automatically, the very low-speed motor M then drives E2 the mixed shaft 25, in order to rotatably drive the high-pressure spool 4 and especially the high-pressure compressor 42. The driving step E2 enables air to be circulated to promote homogeneous cooling in the primary stream V1. Preferably, the driving step E2 is implemented at a speed V of less than 10 rpm and a duration t of more than 30 minutes. Preferably, the driving step E2 is implemented at a speed V of less than 5 rpm and a duration t of more than 45 minutes. This ensures an efficient air circulation which prevents the appearance of the "bowed rotor" phenomenon. During the driving step E2, the high-speed equipment E' is also rotatably driven at low speed, which does not enable the generation of energy but does not cause damage.

Figure 9:
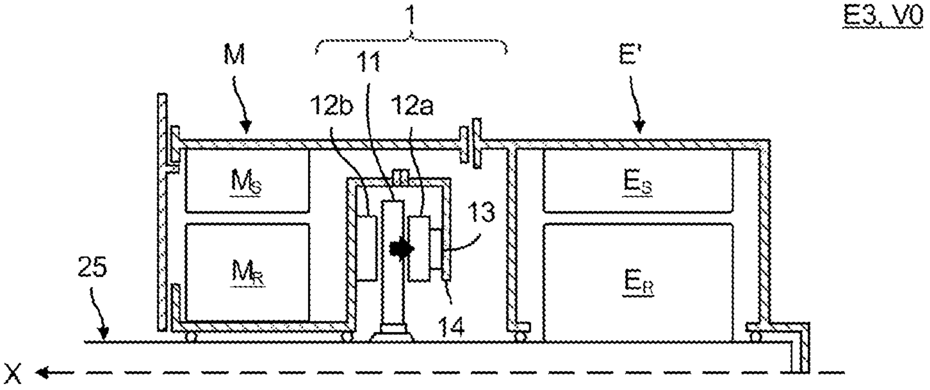
FIG. 9 is a schematic representation of the step of declutching the very low-speed motor according to the method of use of FIG. 6.

With reference to FIG. 9, at the end of the duration t, the declutching step E3 is implemented to move the clutch system 1 from the clutched position P1 to the declutched position P2. As with the clutching step E1, the declutching step is preferably implemented when the mixed shaft 25 is stopped to preserve the disks 12*a*, 12*b*. At the end of the declutching step E3, the very low-speed motor M is decoupled from the mixed shaft 25 so that the turbomachine 8 can be put back safely into operation for the very low-speed motor M. During its operation, the high-speed equipment E' is driven at high speed and enables the generation of electrical energy optimally without impacting the declutched very low-speed motor M.

Preferably, the method of use described previously is implemented automatically after each stop A of the turbomachine 8. Such a method is advantageously simple, convenient and fast.

The invention claimed is:

1. An accessory gearbox for an aircraft turbomachine, the turbomachine extending along a longitudinal axis and comprising a low-pressure spool, a high-pressure spool and a radial shaft connected to the high-pressure spool, the accessory gearbox comprising a gear train comprising at least one input shaft, configured to be mechanically coupled to the radial shaft, and a plurality of output shafts, configured to be rotatably coupled to a plurality of equipment, at least one of the plurality of output shafts being a mixed shaft rotatably coupled to a high-speed equipment configured to operate over a high speed range, the high-speed equipment being rotatably integral with the mixed shaft so as to be driven in rotation at a same speed, the accessory gearbox comprising:

a very low-speed motor configured to operate over a very low speed range, below the high speed range of said high-speed equipment, the very low-speed motor comprising a rotor and a stator and mounted to the mixed shaft, a clutch system mounted to the mixed shaft, wherein the very low-speed motor and the high-speed equipment are mounted in series and coaxially so that:

the clutch system is in a clutched position when the turbomachine is stopped to couple the very low-speed motor to the mixed shaft to rotatably drive the high-pressure spool, and the clutch system is in a declutched position when the turbomachine is in operation to decouple the very low-speed motor from the mixed shaft in order to protect the very low-speed motor from speeds transmitted by the high-pressure spool to said mixed shaft to drive the high-speed equipment, the clutch system comprising:

a flywheel rotatably connected to said mixed shaft, a support member rotatably integral with the rotor of the very low-speed motor, a movable disk having a body and a fixed disk having a body mounted along the longitudinal axis on either side of the flywheel, the fixed disk being integrally mounted with the support member, a movement member having a body mechanically coupled to the movable disk so that: (a) in the clutched position, the flywheel is engaged with the movable disk and the fixed disk, and (b) in the declutched position, the flywheel is disengaged from the movable disk and the fixed disk, and the support member comprises two mounting portions facing each other on either side of the flywheel and a bonding portion connecting the mounting portions to enable the flywheel to be mounted inside the support member.

2. The accessory gearbox according to claim 1, wherein the very low-speed motor is rotatable at a speed of 10 rpm or less.

3. The accessory gearbox according to claim 1, wherein the flywheel is mounted along the longitudinal axis of said mixed shaft.

4. The accessory gearbox according to claim 1, wherein the movement member is an electromagnetic actuator.

5. The accessory gearbox according to claim 1, wherein the movable disk and the fixed disk are free of lining.

6. An aircraft turbomachine extending along a longitudinal axis and comprising a low-pressure spool, a high-pressure spool, and a radial shaft connected to the high-pressure spool, the aircraft turbomachine comprising an accessory gearbox according to claim 1, wherein:

the at least one input shaft of the accessory gearbox is mechanically coupled to the radial shaft, in the clutched position, the very low-speed motor is coupled to the high-pressure spool so as to rotatably drive the high-pressure spool to facilitate cooling of the high-pressure spool by air circulation when the turbomachine is stopped, in the declutched position, the very low-speed motor is decoupled from the high-pressure spool so that the high-pressure spool drives the mixed shaft to drive the high-speed equipment without driving the very low-speed motor when the turbomachine is in operation.

7. A method of using an aircraft turbomachine of claim 6, wherein the clutch system is initially in the declutched position, the method of use comprising:

after the turbomachine has stopped, a step of clutching the very low-speed motor to said mixed shaft, by moving the clutch system to the clutched position, and a step of driving, by the very low-speed motor, said mixed shaft, so as to rotatably drive the high-pressure spool in order to promote its cooling by air circulation.

8. The method of use according to claim 7, wherein, during the driving step, the very low-speed motor is driven for a duration of more than 30 minutes.

9. The method of use according to claim 7, wherein, during operation of the turbomachine, the clutch system is in the declutched position so that the high-pressure spool drives said mixed shaft decoupled from the very low-speed motor, in order to drive only the high-speed equipment.

10. The accessory gearbox of claim 1, wherein the high-speed equipment is a generator comprising a stator and a rotor, and wherein the rotor of the high-speed equipment is integrally mounted to the mixed shaft so as to be directly rotatable by the mixed shaft.

11. The accessory gearbox of claim 1, wherein the flywheel is longitudinally moveable relative to the mixed shaft.

* * * * *